United States Patent [19]

Sakano et al.

[11] 3,735,401

[45] May 22, 1973

[54] ALARM APPARATUS FOR PREVENTING COLLISION OF MOVING BODIES

[75] Inventors: Nozomu Sakano, Tsuneo Yamanaka, Yokohama; Kumekichi Shibagaki, Katsumi Kawabe, both of Tokyo, all of Japan

[73] Assignee: Tokyo Shibaura Electric Co., Ltd., Kawasaki-shi, Ishikowajima-Harima Heavy Industries Co., Ltd., Chiyoda-ku, Tokyo, both of Japan

[22] Filed: July 27, 1970

[21] Appl. No.: 58,470

Related U.S. Application Data

[63] Continuation-in-part of Ser. No. 810,166, March 25, 1969, abandoned.

[30] Foreign Application Priority Data

Mar. 30, 1968 Japan ............................. 43/20684

[52] U.S. Cl. ........................... 343/11 R, 343/112 CA
[51] Int. Cl. ............................................ G01s 9/02
[58] Field of Search ...................... 343/11, 112 CA

[56] References Cited

UNITED STATES PATENTS

| 3,396,390 | 8/1968 | Riggs et al. | 343/112 CA X |
| 3,388,395 | 6/1968 | Gumphrey et al. | 343/11 R |
| 3,005,194 | 10/1961 | Goodell et al. | 343/11 R X |
| 3,553,690 | 1/1971 | Spangler | 343/11 R |
| 3,009,145 | 11/1961 | Reeder et al. | 343/11 R |

*Primary Examiner*—Malcolm F. Hubler
*Attorney*—Flynn & Frishauf

[57] ABSTRACT

An alarm apparatus for preventing collision of moving bodies, especially shops, comprises a radar system and a processing device to process the information from the radar system. In the information processing device the field of the radar is divided into a plurality of unit areas, the information for each unit area is stored in a corresponding digital or analog memory device and the information stored therein is read out at predetermined sequential times to provide information regarding the possibility of occurrence of a collision of the moving bodies.

6 Claims, 17 Drawing Figures

(VIDEO SIGNAL) IN
OUT
+Ebb
-Ebb

FIG. 6 { A, B }

THRESHOLD LEVEL

ALARM APPARATUS FOR PREVENTING COLLISION OF MOVING BODIES

CROSS-REFERENCE TO RELATED APPLICATIONS

This is a continuation-in-part of U.S. Application Ser. No. 810,166 filed Mar. 25, 1969, now abandoned.

BACKGROUND OF THE INVENTION

This invention relates to an alarm apparatus for preventing collision of moving bodies and more particularly to an alarm apparatus utilizing a radar for preventing collision of ships and like vehicles.

Recent increases in the number of ships and their speed has increased the danger of their collision.

Radars are playing important rolls to assure safe navigation and to decrease the danger of collision. However, present day radar systems wherein the possibility of occurrence of ship collision is judged by constantly plotting and monitoring courses of all ships displayed on the PPI of a radar system are not yet satisfactory in that their accuracy is not sufficient and operation is rather complicated. Slight carelessness of the operator may cause serious disaster. Accordingly, it is desired that a new system be developed in which information regarding other ships is automatically processed to indicate the presence of other ships that may cause a collision and in which an alarm signal is accordingly generated. Thus, for example, even when the forward direction of a ship is watched by a radar mounted thereon there is a risk of being collided other ships at the stern. Therefore, an automatic system that can prevent collision in any direction is highly desirable.

A prior art collision preventing system is based on an air traffic control system or a base air defense ground equipment (BADGE) system. According to this system reflected radar waves are converted into digital quantities by means of a computer and the waves reflected by a moving body are distinguished from noises or false reflected waves. By the statistical processing of reflected waves the movement including future direction and speed of a moving body is anticipated and allowable movement is also determined. When the actual movement is determined, the computer operates to anticipate future movement. Thus it is possible to track movements of many objects with an accuracy less than the resolution of the radar. However, such a radar processing system is elaborate and operates at very high speeds so that such a system is uneconomical for use on ships. Ship radars are generally of relatively simple and inexpensive construction. Therefore, without relying upon proper judgement of the operator, automatic steering or calculation of the steering angle is not possible. Recently, another approach has been proposed wherein a plurality of analog computers are installed to determine future movements of a plurality of ships of the same number as the number of computers. Where 10 analog computers are used, the future courses of 10 ships may be anticipated. However, that of the 11th ship can not be determined. Thus, even such a complicated system is not yet satisfactory for use on ships.

SUMMARY OF THE INVENTION

It is therefore an object of this invention to provide an alarm apparatus for preventing collision of moving bodies such as ships which is capable of automatically processing information regarding movements of moving bodies at high accuracies with simple operations.

According to this invention, there is provided an alarm apparatus for preventing collision of moving bodies comprising a radar device including an antenna, transceiver equipment and an indicator, an information processing means including means to divide signals received by the receiving device into predetermined angular ranges within the field of the radar and to store said divided signals and means to provide an alarm for a given angular range whenever said divided and stored quantity for said angular range exceeds a predetermined quantity in a predetermined interval of time.

DETAILED DESCRIPTION OF THE PREFERRED EMBODIMENTS

Figure 1:
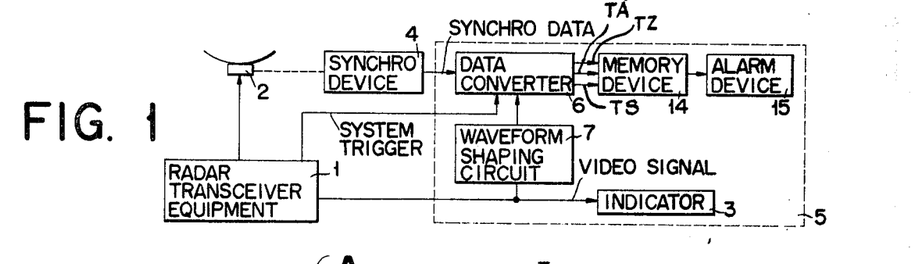
FIG. 1 shows a block diagram of one embodiment of the alarm apparatus for preventing collision of moving bodies constructed according to the principle of this invention.

Referring now to FIG. 1 which shows one embodiment of this invention to prevent collision of ships wherein information obtained by a radar mounted on a ship is indicated digitally, signals to be transmitted from a radar transceiver equipment 1 are radiated into air as electromagnetic waves from an antenna 2. The radiated electromagnetic waves are reflected by a nearby ship or ships and received by the antenna 2. The received signals are applied to the radar transceiver equipment 1 to be converted into video signals which are applied to an indicator 3 to display a visible image of the target, for example, the nearby ship or ships.

Figure 2:
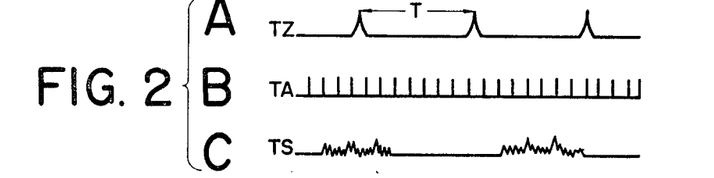
FIGS. 2A, 2B and 2C show signal waveforms to explain the operation of the circuits shown in FIGS. 4, 7 and 10.
Figure 7:
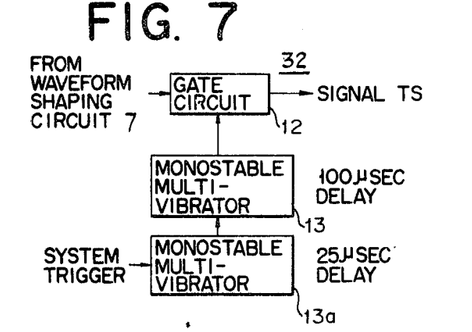

The antenna 2 is rotated 360° in the horizontal direction by an electric motor (not shown) through a gear device (not shown) to provide a horizontal field over 360° for the radar. A synchro device 4 is connected to the gear device to obtain an output signal or synchro data signal corresponding to the rotational angle of the antenna in the horizontal direction. A data converter 6 comprises signal generators 30 and 31, and a range gate circuit 32, as respectively shown in FIGS. 3, 4 and 7, to produce a time origin signal Tz, a channel division signal TA, and a gated video signal TS as shown in FIG. 2.

Figure 3:
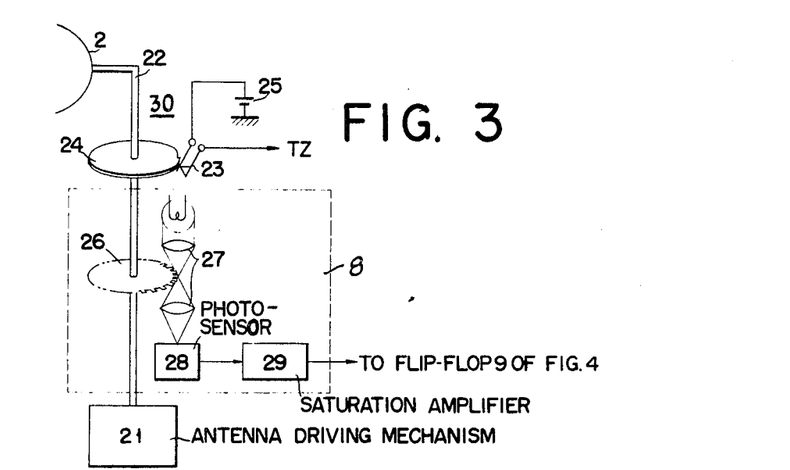
FIGS. 3, 4 and 7 show block diagrams of apparatus for obtaining signals shown in FIGS. 2A and 2C.

The time origin signal TZ is generated for each one rotation of the antenna 2 by a signal generator 30 having a power source 25 and switching means 23 operated by a disk 24 having a cam mounted on a shaft 22 of an antenna dividing mechanism 21 as illustrated, for example, in FIG. 3.

The synchro data signal generated by the synchro device 4, a system trigger signal commonly used in the transceiver equipment 1 and a portion of the video signal supplied to indicator 3 from transceiver equipment 1 are applied to the data converter 6 included in an information processing section 5 bounded by dotted lines. The video signal may be applied to data converter 6 through a waveform shaping circuit 7.

Figure 4:
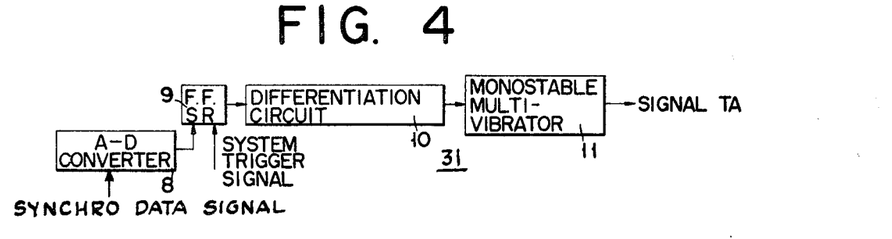

As shown in FIG. 4, the signal generator 31 of the data converter 6 includes an analog-digital (A – D) converter 8, as shown in FIG. 3, which converts the synchro data signal which may be an analog signal into a digital signal. The analog digital converter 8 may be a conventional photoelectric chopper comprising a toothed disk 26 coupled to the shaft 22 of the antenna driving mechanism 21, optical systems 27, a photosensor 28 and saturation amplifier 29. In the present arrangement the disk 26 of the photoelectric chopper is provided with 100 teeth. Therefore, when the antenna 2 makes one complete rotation, then 100 pulses of predetermined width are derived out from the saturation amplifier. The digital signal from A – D converter 8 and the system trigger signal are respectively supplied to the set and reset terminals of flip-flop circuit 9. As the pulse repetition number of the output from A–D converter 8 is much less than that of the system trigger signal, flip-flop circuit 9 is normally reset and provides an output only when the output from A–D converter 8 is applied to the set terminal thereof. The output from flip-flop circuit 9 is applied to a differentiation circuit 10, and the differentiated output therefrom is applied to a monostable multivibrator 11 having a predetermined output width. In this manner, monostable multivibrator 11 provides a channel division signal TA corresponding to the synchro data signal and being synchronized with the system trigger signal as shown in FIG. 2B. The monostable multivibrator 11 is constructed such that it provides 100 channel division signals for each one complete rotation of antenna 2, or one channel division signal for each 3.6° rotation of the antenna 2. In other words, the number of channel divisions equals 100.

Figure 5:
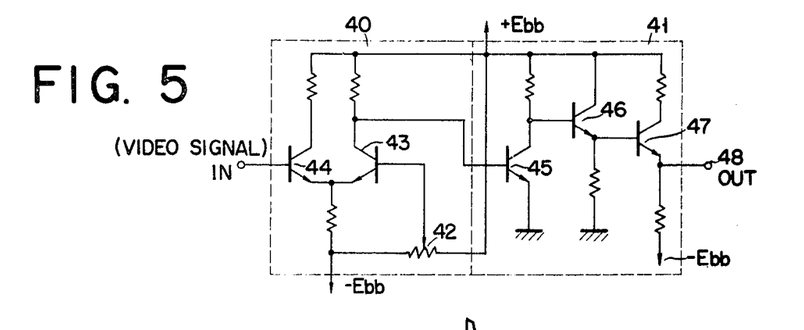
FIGS. 5 illustrates an example of the waveform shaping circuit shown in FIG. 1.
Figure 6:
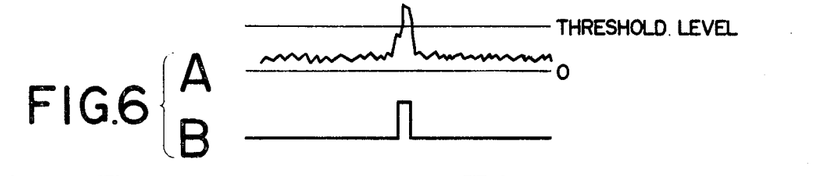
FIGS. 6A and 6B show signal waveforms respectively appearing at the input and output terminals of the circuit shown in FIG. 5.

Assuming now that the dangerous area in which a given ship may collide with other ships is set to be from 2 to 10 nautical miles around said given ship, then the video signal supplied to data converter 6 from a waveform shaping circuit 7 will be gated so that a video signal containing information corresponding to this area may be obtained. The video signal processed in this manner is termed as a gated video signal TS and has a waveform as shown in FIG. 2C. The waveform shaping circuit 7 may be composed of a differential amplifier 40 and a pulse amplifier 41 as illustrated for example in FIG. 5. In this circuit the differential amplifier is set at the threshold level shown in FIG. 6A by adjusting a variable resistor 42 connected to the base of a transistor 43, and adapted to amplify the video signal supplied to the base of a transistor 44 from the radar transceiver equipment 1 and to delete a noise signal component and a "sea clutter" included in the video signal. The output signal of the differential amplifier 40 is supplied from the collector of the transistor 43 to the pulse amplifier 41 of the next stage. The pulse amplifier 41 comprises direct-coupled transistor 45, 46 and 47 and the output signal of the amplifier 41 as shown in FIG. 6B is provided from an output terminal 48 to the data converter 6. The above-mentioned waveform shaping circuit 7 may also be made up of a Schmitt trigger circuit and an amplifier. In order to limit the video signals to those in a predetermined distance range within the field of the radar, video signals from waveform shaping circuit 7 are supplied to the range gate 32 including a gate circuit 12, and monostable multivibrators 13 and 13a shown in FIG. 7. Thus, by applying a gate signal to gate circuit 12 from monostable multi-vibrators 13 and 13a which is supplied with the system trigger, for example, to enable the gate circuit 12 for a predetermined interval (25 $\mu$ sec to 100 $\mu$ sec) corresponding to the range (2 to 10 nautical miles) it is able to readily provide a gated video signal TS containing information regarding the desired range. Signals SIgnals TZ, TA and TS provided by data converter 6 are applied to a memory device 14, shown in FIG. 1 and including a plurality of memory elements which are divided into a plurality of groups the number of which corresponds to the number of the channel division signals TA during one rotation of the antenna 2. Gated signals TS are stored in predetermined addresses in respective groups of the memory elements corresponding to the channel division signal TA. Thus, a plurality of memory elements provided in the memory device 14 are divided into a plurality of groups to store the time angle distributed video signals which vary in accordance with the passage of time or variation of angle, so that information on the possibility of the occurrence of the collision with the approaching ships can be obtained. For example, to store the video signals distributed in each angle of 3.6°, said plurality of memory elements are divided into 100 groups. This operation is performed repeatedly for a predetermined time interval and each time the time original signal TZ shown in FIG. 2A is generated to count the digital quantity in each address in the respective groups. When the count exceeds a preset value after the elapse of a predetermined time interval, a collision alarm signal is sent to an alarm device 15 for each divided channel. At the same time a dangerous direction is indicated and the contents which have been stored in all memory elements are reset. The reset operation can also be performed by hand.

Figure 8A:
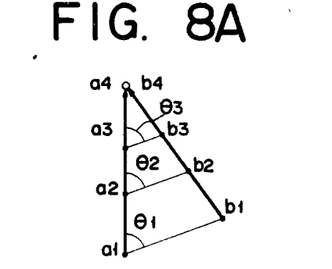
FIGS. 8A, 8B, 9A and 9B show illustrations for presenting the principle of the invention.
Figure 8B:
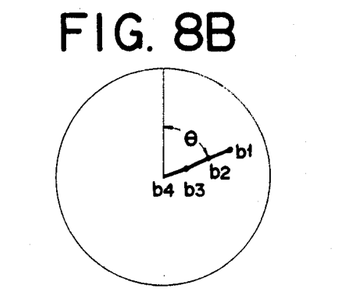
Figure 9A:
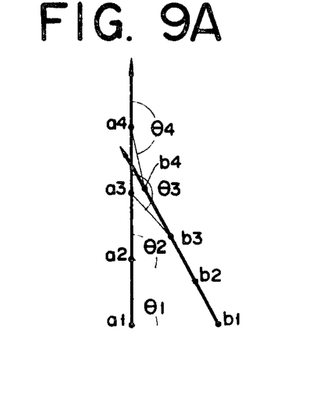
Figure 9B:
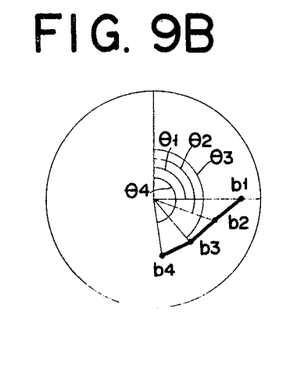

The principle of collision avoidance according to the present invention is now described more in detail. FIGS. 8A and 9A are absolute co-ordinates showing the relation between the observation ship and the object ship and FIGS. 8B and 9B show a PPI scope corresponding thereto. Assume that in these figures the positions of the observation ship $a_1$, $a_2$, $a_3$ and $a_4$ and the positions of the object ship $b_1$, $b_2$, $b_3$ and $b_4$ are at times $t_1$, $t_2$, $t_3$ and $t_4$. Where the observation ship collides with the object ship at the time $t_4$, azimuth angles $\theta_1$, $\theta_2$, $\theta_3$ and $\theta_4$ are constant at all times when viewing the object ship from the observation ship as shown in FIG. 8A. Thus, the locus displayed on the PPI scope by the video signal obtained from the object ship by means of the radar device of the observation ship will be rectilinear toward the center of the PPI scope as shown in FIG. 8B. On the other hand, where the observation ship does not collide with the object ship, the azimuth angles $\theta_1$, $\theta_2$, $\theta_3$ and $\theta_4$ will be varied every moment as shown in FIG. 9A when viewing the object ship from the observation ship. Thus, the locus represented on the PPI scope in the observation ship will not pass through the center point of the viewing screen and it will not also be rectilinear as shown in FIG. 9B. The possibility of collision with the other ship can be automatically and accurately detected by counting and storing the video signal TS present in a range of predetermined distance and at a predetermined azimuth angle and by determining whether or not the counted value exceeds a preset value.

Figure 10:
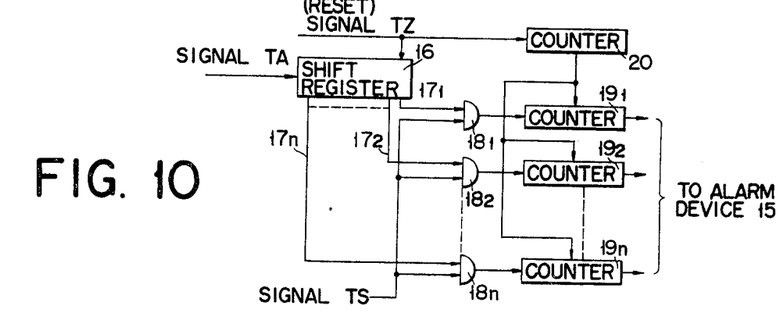
FIG. 10 illustrates an example of a memory device shown in FIG. 1.

As diagrammatically shown in FIG. 10, memory device 14 includes a shift register 16. The shift register 16 is provided with registers of a number corresponding to the number of channel division signals TA appearing in one period of the time origin signal TZ, and output terminals $17_1$, $17_2$, ... $17_n$ of the same number. The channel division signal TA is impressed upon an input terminal of shift register 16 while the time origin signal TZ upon a reset terminal. Therefore, after the shift register 16 is cleared by the time origin signal TZ, the content thereof is shifted to sequentially provide output signals on the output terminals $17_1$, $17_2$, ... $17_n$. Output signals for detecting the presence of the risk of collision are respectively applied to one input terminal of two input AND gate circuits $18_1$, $18_2$, ... $18_n$, other input terminals thereof being connected together to receive gated video signal TS. Output terminals of AND gate circuits $18_1$, $18_2$, ... $18_n$ are connected to input terminals of respective digital counters $19_1$, $19_2$, ... $19_n$, each including a plurality of memory elements of the number corresponding to the number of channels and the digital counters $19_1$, $19_2$, ... $19_n$ count the output pulses from the AND gate circuits $18_1$, $18_2$, ... $18_n$, respectively. The capacity of digital counters $19_1$, $19_2$, ... $19_n$ should be preset to that corresponding to the case wherein it is necessary to transmit an alarm signal in an actual dangerous condition. However, such presetting of the capacity should be made by taking into consideration all situations that may occur during navigation of ships. Thus, when a counter $19_1$, for example, among a number of digital counters $19_1$, $19_2$, ... $19_n$ counts up its preset capacity within a prescribed time interval, the counter $19_1$ will provide an alarm signal to a corresponding alarm device 15. After elapse of a predetermined time interval, counter 20 which counts the number of time origin signal TZ provides a reset signal to reset all digital counters $19_1$, $19_2$, ... $19_n$ to prepare for the next cycle of operation.

Figure 11:
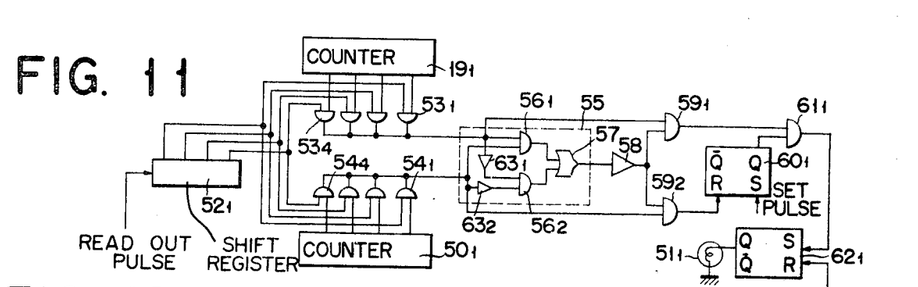
FIG. 11 illustrates an example of an alarm device shown in FIG. 1.

As indicated in FIG. 11, the alarm device 15 is operated to light a lamp $51_1$ when the counter content of the digital counters, for example the digital counter $19_1$, of the memory device 14 exceeds the predetermined reference value. The memory counter $50_1$ has the reference value preset in dependence upon the actual dangerous condition. The input into a shift register $52_1$ of read-out pulses causes the counter content of the digital counter $19_1$ and the reference value of the memory counter $50_1$ to be compared for each digit of the number. Assume now that the reference value of the counter $50_1$ is "1101" and the counter content of the digital counter $19_1$ is "1110". The output of the shift register $52_1$ is sequentially supplied to the AND gate circuits $53_1$, ... $53_4$ and to the AND gate circuits $54_1$, ... $54_4$, causing the content of the digital counter $19_1$ to be successively read out from the most significant digit for delivery to a comparison circuit 55. Since the value "1101" coincides in content with the value "1110" up to the second digit of higher order, the output of an AND gate $56_1$ becomes "1", the signal of which passes through an OR gate circuit 57 to an inverter circuit 58 where it is inverted into "0". Thus, no outputs are produce from both the AND gate circuits $59_1$ and $59_2$. In the third digit of the number the output of the digital counter $19_1$ is "1" and the output of the memory counter $50_1$ is "0". Thus, the output of the OR gate circuit 57 becomes "0", the signal of which is inverted into "1" in the inverter circuit 58, thus producing the output "1" from the AND gate circuit $59_1$. A flip-flop circuit $60_1$ has been preset in readiness for the operation of the alarm device and, since the output "1" is already appearing from the output terminal of the flip-flop circuit $60_1$, a set pulse putting the flip-flop circuit $62_1$ into the set condition is produced from an AND gate circuit $61_1$, causing the lamp to be lit. In the fourth digit of the number, the output of the digital counter $19_1$ is "0", the signal of which is inverted in the inverter circuit $63_1$, causing one input of the AND gate circuit $56_2$ to become "1". On the other hand, the output of the memory counter $50_1$ is "1", the signal of which is inverted in an inverter circuit $63_2$, causing the other input of the AND gate circuit $56_2$ to become "0". Then the inputs of AND gate $56_1$ are also "0" and "1". Thus, no outputs are produced from both the AND circuits $56_1$ and $56_2$. This causes the output of the inverter circuit 58 to become "1", producing the output from an AND gate $59_2$ whereby the flip-flop circuit $60_1$ is reset. However, this will not exert any influence upon the lighting of the lamp $51_1$, i.e., the alarm condition. In this way, the alarm device can display the possibility of the risk of collision before actual occurrence and it may, of course, be replaced with any alarm means, i.e., buzzers, other than the lamp.

Although the above described embodiment of this invention utilizes a digital system, an analog system can also be utilized.

In the case of utilizing an analog system, similar to the case of utilizing a digital system the video signal of the radar is divided into a plurality of processing areas, but the video signal is stored on the storage mesh of a conventional memory tube or a storage tube with a secondary electron multiplier for a predetermined interval of time and the stored signal is read out with a period corresponding to one rotation of an antenna or scanner.

With this system, too, where the relative direction of other ships with regard to a given ship is constant, the memory tube provides an output pulse train of the stored image so that by checking the level of this output signal it is possible to detect said other ships, which are likely to collide with the subject ship and to produce an alarm signal concurrently with the indication of a dangerous orientation. To scan the memory tube, in the vertical direction (direction of range) a high speed sweep is made in synchronism with the radar trigger pulse whereas in the horizontal direction (azimuth) a low speed sweep is made in synchronism with the rotation of the antenna or scanner. Then the output from the memory tube will be detected corresponding to the rotation of the antenna or scanner.

Figure 12:
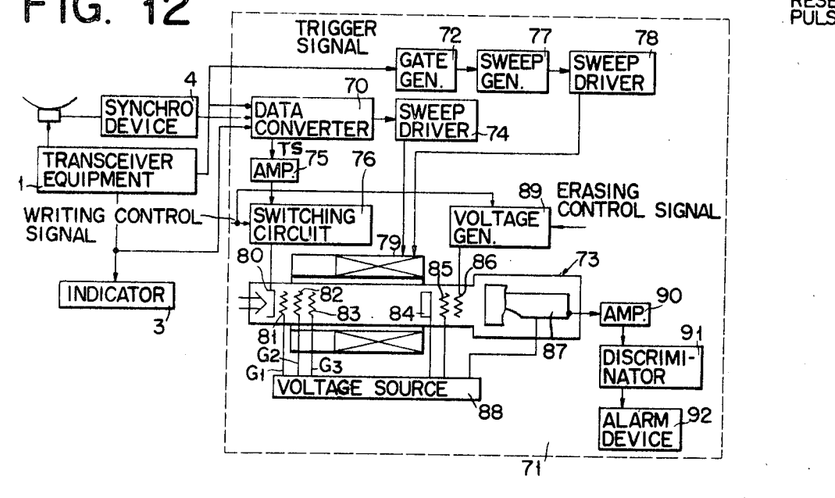
FIG. 12 is a block diagram of another embodiment of this invention.
Figure 14:
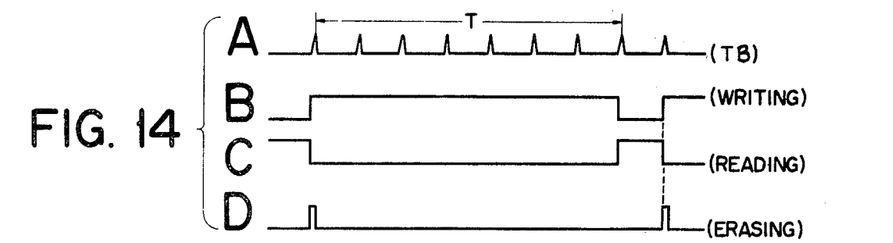
FIGS. 14 and 15 show signal waveforms to explain the operation of the circuits shown in FIGS. 12 and 13.

FIG. 12 shows a block diagram of another embodiment. In this figure, an antenna 2, a synchro device 4, a transceiver 1 and an indicator 3 are comprised in a radar equipment identical to that shown in FIG. 1. Synchro data signal TB as shown in FIG. 14A from synchro device 4, a system trigger signal and the video signal from transceiver 1 are supplied to a signal or data converter 70 of an information processing section 71 bounded by dotted lines while the system trigger signal as shown in FIG. 15A from transceiver 1 is also applied to a gate signal generator 72.

Figure 15:
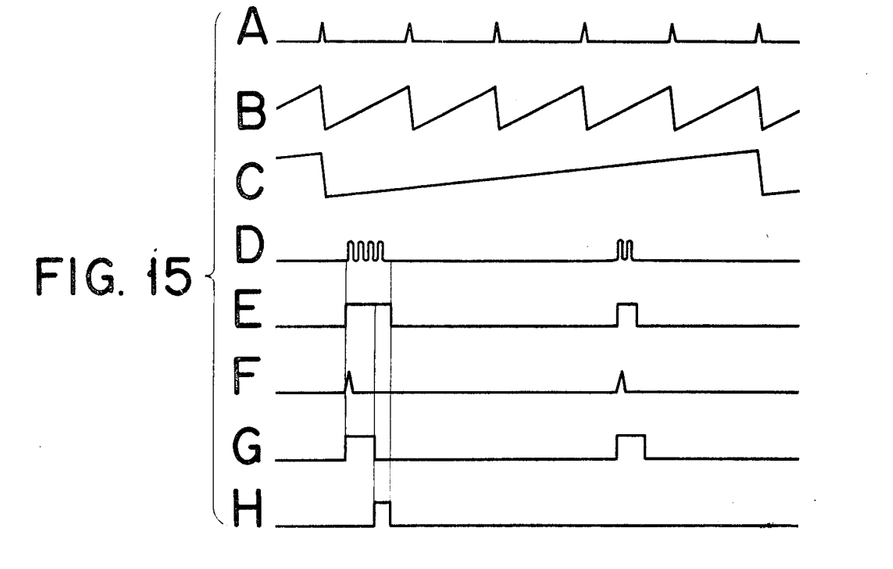

Data converter 70 operates to generate a low speed sweep current as shown in FIG. 15C in the horizontal direction (in the direction of $\theta$) of a grid controlled memory tube 73 to be described later in synchronism with the output corresponding to the rotation of scanner or the synchro data which are produced by synchro device 4 and applies the generated sweep current to a sweep driver 74. The low speed sweep current can be obtained by using a conventional sweep generator such as, for example, a $\theta$ sweep generator described in Massachusetts Institute of Technology Radiation Laboratory Series, Vol. 1, "Radar System Engineering" chapter 13, pp. 524–544, McGraw Hill Book Company Inc. Like the previous embodiment, data converter 70 further operates to convert the radar video signal into a gated video signal TS for a predetermined processing area and applies the gated video signal to a writing amplifier 75. It is noted that the range gate circuit of the video signal may be same as that shown in FIG. 7. The gated video signal TS is amplified to a level sufficient to be written in the memory tube 73 and is then applied to a write-read switching circuit 76.

The system trigger pulse applied to gate generator 72 is then applied to a sweep generator 77 to generate a high speed sweep current as shown in FIG. 15B in the vertical direction (in the direction of $\gamma$) in synchronism with the radar trigger pulse as shown in FIG. 15A, which is applied to a sweep driver 78. (The $\gamma$ sweep generator 77 is also described in said publication recited above.) This sweep driver 78 supplies the high speed sweep current to a deflection coil for the $\gamma$ direction of memory tube 73 in synchronism with the trigger pulse whereas the other sweep driver 74 supplies the low speed sweep current to the deflection coil in the $\theta$ direction of memory tube 73 in synchronism with the rotation of the scanner. In FIG. 12, deflection coils in the directions of $\gamma$ and $\theta$ are generally designated by a reference numeral 79. Thus, this sweep system comprises the so-called B type sweep system or B scope display system.

As schematically shown in FIG. 12, the grid controlled memory tube 73 comprises a sealed envelope, a cathode electrode 80 connected to receive the gated radar video signal TS from switching circuit 76, first, second and third grid electrodes 81, 82 and 83, decelerating electrode 84, a collector mesh 85, a storage mesh 86 and a secondary electron multiplier 87 which are disposed in the envelope in the order mentioned along the path of travel of an electron beam emitted from cathode electrode 80. These component elements of memory tube 73 are supplied with suitable operating potentials from a conventional source of voltage 88. An independent voltage generator 89 is provided to apply to storage mesh 86 a voltage signal which is obtained by applying a signal as shown in FIG. 14D to the generator 89 for erasing the stored charge. Since such a memory tube is well known in the art it is believed unnecessary to describe it in detail. A writing gate signal and a reading gate signal are supplied from a control signal generator (not shown) to the said write-read switching circuit 76. Waveforms of the writing and reading gate signals are shown in FIGS. 14B and 14C respectively.

When the writing gate signal is supplied to the switching circuit 76, the gated video signal TS is impressed upon the cathode electrode 80 of memory tube 73 for writing, and the electron beam emitted from the cathode electrode is subjected to an intensity modulation in accordance with the video signal, thus storing an electric charge on storage mesh 86 corresponding to the video signal. As mentioned above, in this embodiment, since the B type sweep system is employed, a plurality of vertical charge groups of the number corresponding to the number of divided channels are formed. After a horizontal sweep corresponding to a predetermined time interval necessary for watching other ships the charge stored on storage mesh 86 is scanned by a uniform electron beam for reading. The intensity of the electron beam that passes through storage mesh 86 is modulated by the control action of storage mesh 86 in accordance with the magnitude of the negative potential on the surface thereof. The electron beam which has passed through storage mesh 86 is directed to the first stage of the secondary electron multiplier 87 and the amplifier signal is applied to an amplifier 90. The read out signal as shown in FIG. 15D amplified by amplifier 90 is then applied to a discriminator 91 which functions to supply an alarm signal to an alarm device 92 only when the read out signal indicates the danger of collision, that is when the signal exceeds a predetermined level while at the same time the direction in which the danger of collision exists is also indicated. The discriminator 91 may be comprised by any suitable well-known circuit which provides an output signal only when its input signal exceeds a predetermined level, such as, for example, the circuit shown in FIG. 13.

Figure 13:
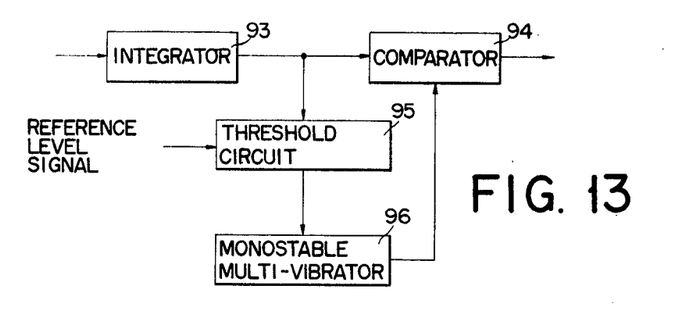
FIG. 13 illustrates an example of a discriminator shown in FIG. 12.

In FIG. 13, the read out signal from amplifier 90 is applied to an integrator 93 to obtain an integrated signal as shown in FIG. 15E. The integrated signal is then applied to a comparator 94 which is, for example a differential amplifier and a threshold circuit 95. To the threshold circuit 95 is also supplied a reference level signal from a well-known signal generator (not shown). Threshold circuit 95 produces a pulse signal as shown in FIG. 15F only when the amplitude of the integrated signal exceeds that of the reference level signal. The pulse signal obtained from the circuit 95 is then supplied to a conventional gate generator, for example, a monostable multivibrator 96 for obtaining a rectangular wave signal as shown in FIG. 15G. The rectangular wave signal obtained from multivibrator 96 is supplied to the comparator 94. The comparator 94 compares the pulse width of the signal from the multivibrator 96 with that of the signal from integrator 93 for obtaining the alarm signal as shown in FIG. 15H to be supplied to the alarm device 92. In order to indicate the dangerous azimuth a plurality of indicating means may be used of the number corresponding to the number of divided channels which are scanned by the electron beam impinging upon storage mesh 86. Thus, for example, a selected lamp among a plurality of azimuth indicating lamps may be lighted.

Thus, this invention provides an apparatus for preventing collision of moving bodies which can positively prevent dangerous collision thereof by promptly and accurately processing information regarding other ships without relying upon the mental judgement of the operator, thus greatly increasing the safety of ship navigation.

Further, the construction of the apparatus is relatively simple and the number of ships to be identified can be increased by merely increasing the number of channels. Moreover, the apparatus can be readily connected to an existing ship radar and can be installed in a limited space on board.

It will be clear that the application of this invention is not limited to ships, and that is equally applicable to vehicles moving on the ground as well as in the air, such as aircraft.

What is claimed is:

1. An alarm apparatus for preventing collision of moving bodies comprising:
    a radar device including:
        an antenna for radiating electromagnetic waves to said moving bodies and picking up said electromagnetic waves reflected from said moving bodies;
        means for rotating said antenna;
        a synchro device interconnected to said rotating means of said antenna to generate a synchro data signal;
        a transceiver for transmitting signals to said antenna and receiving signals through said antenna to produce video signals corresponding to said moving bodies; and
        an indicator coupled to said transceiver for displaying a visible image in accordance with said video signals;
    means for receiving a system trigger signal, said synchro data signal, and said video signals derived from said radar device, and being responsive to the received signals for converting said video signals into gated video signals in order to detect said moving bodies in a predetermined range;
    a memory device for storing said gated video signals corresponding to a plurality of predetermined angular areas in the field of said radar device; and
    means to provide an alarm for a given angular area when the quantity of said stored signals for said given angular areas exceeds a predetermined quantity for a predetermined interval of time.

2. An alarm apparatus according to claim 1 wherein:
    said receiving and converting means includes:
        a first signal generator coupled to said rotating means for generating time origin signals in accordance with the rotation of said antenna;
        a second signal generator responsive to said synchro data signal for generating channel division signals corresponding to said angular areas; and
        a range gate circuit receiving said video signals in order to detect said moving bodies in a predetermined range;
    said memory device includes:
        a first counter for counting said gated video signals in accordance with said channel division signal; and
        a second counter for storing reference values present in accordance with a predetermined dangerous or alarm condition; and
    said means for providing an alarm for a given angular area comprises:
        a comparator for comparing the contents of said first counter with the reference values present in said second counter; and
        an alarm device responsive to the output of said comparator to display an indicia indicating the possibility or risk of collision.

3. An alarm apparatus according to claim 2 wherein:
    said second signal generator includes:
        an A-D converter for converting the synchro data signal into a digital signal;
        a flip-flop circuit set by said digital signal and reset by the system trigger signal;
        a differentiation circuit for differentiating the output signals derived from said flip-flop circuit; and
        a monostable multivibrator triggered by the output signals derived from said differentiation circuit to produce said channel division signals; and
    said range gate circuit includes:
        a monostable multivibrator triggered by the system trigger signal and producing gating signals corresponding to a predetermined range; and
        a gate circuit controlled by said gating signals to produce the gated video signals.

4. An alarm apparatus according to claim 1 wherein:
    said receiving and converting means includes:
        a range gate circuit receiving and video signals and producing said gate video signals in order to detect said moving bodies in a predetermined range;
        a first sweep generator responsive to said synchro data signals for generating a first sweep signal in accordance with said synchro data signals;
        a first sweep driver coupled to said first sweep generator for providing a vertical sweep current;
        a second sweep generator responsive to said system trigger signal for generating a second sweep signal in accordance with said system trigger signal;
        a second sweep driver coupled to said second sweep generator for providing a horizontal sweep current;
        means for writing said gated video signal in said memory device;
        means for reading out said gated video signal stored in said memory device; and
        means for erasing said gated video signal stored in said memory device;
        said memory device comprises a storage tube including:
    deflection coils connected to receive the vertical and horizontal sweep currents derived from said first and second sweep drivers, respectively; and
        a storage mesh adapted to accumulate electric charge corresponding to said gated video signal; and
    said alarm providing means includes:
        a discriminator means responsive to the output of said storage tube read out by said reading means to detect the presence of the risk of collision in a given angular area; and
        an alarm device responsive to the output from said discriminator to provide an alarm signal.

5. An alarm apparatus according to claim 4 wherein said discriminator means includes:

an integrator for integrating the output of said storage tube;

a threshold circuit coupled to said integrator and providing an output only when the amplitude of the integrated signal exceeds that of a reference level signal;

a monostable multivibrator coupled to the output of said threshold circuit for generating a rectangular wave signal having a predetermined pulse width; and a comparator for comparing the pulse width of the output signal from said monostable multivibrator with that of the signal from said integrator, and for generating an alarm signal as a function of said comparison.

6. An alarm apparatus according to claim 5 wherein said comparator generates the alarm signal when the width of the output signal from said integrator exceeds that of the output of said multivibrator.

* * * * *